Feb. 16, 1926.
J. K. OLSEN
RANGE LIMITING DEVICE FOR SEARCHLIGHTS
Filed Jan. 24, 1923
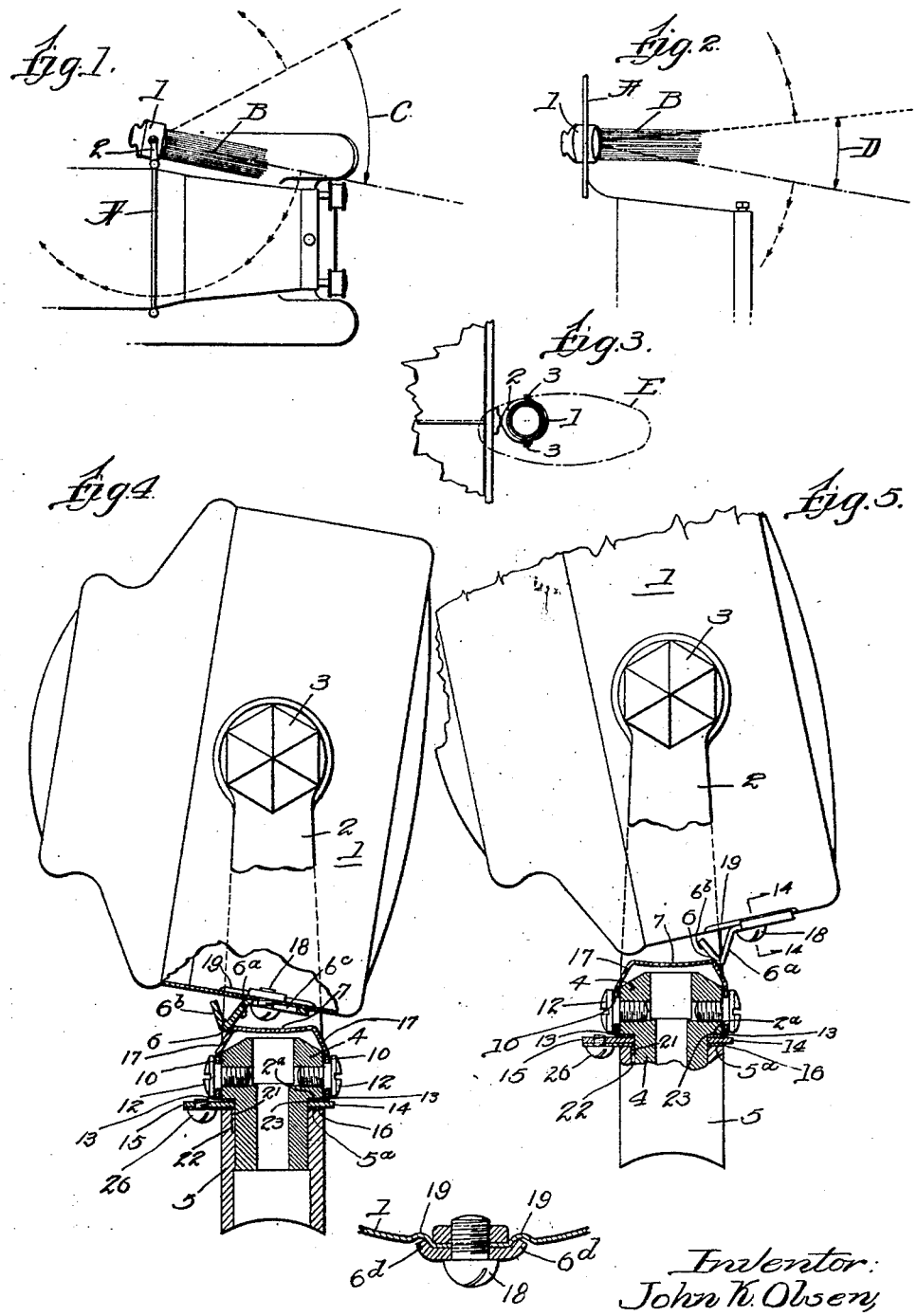
Inventor:
John K. Olsen,
By Burton & Burton
his Attys.

Feb. 16, 1926. 1,573,418
J. K. OLSEN
RANGE LIMITING DEVICE FOR SEARCHLIGHTS
Filed Jan. 24, 1923 2 Sheets-Sheet 2
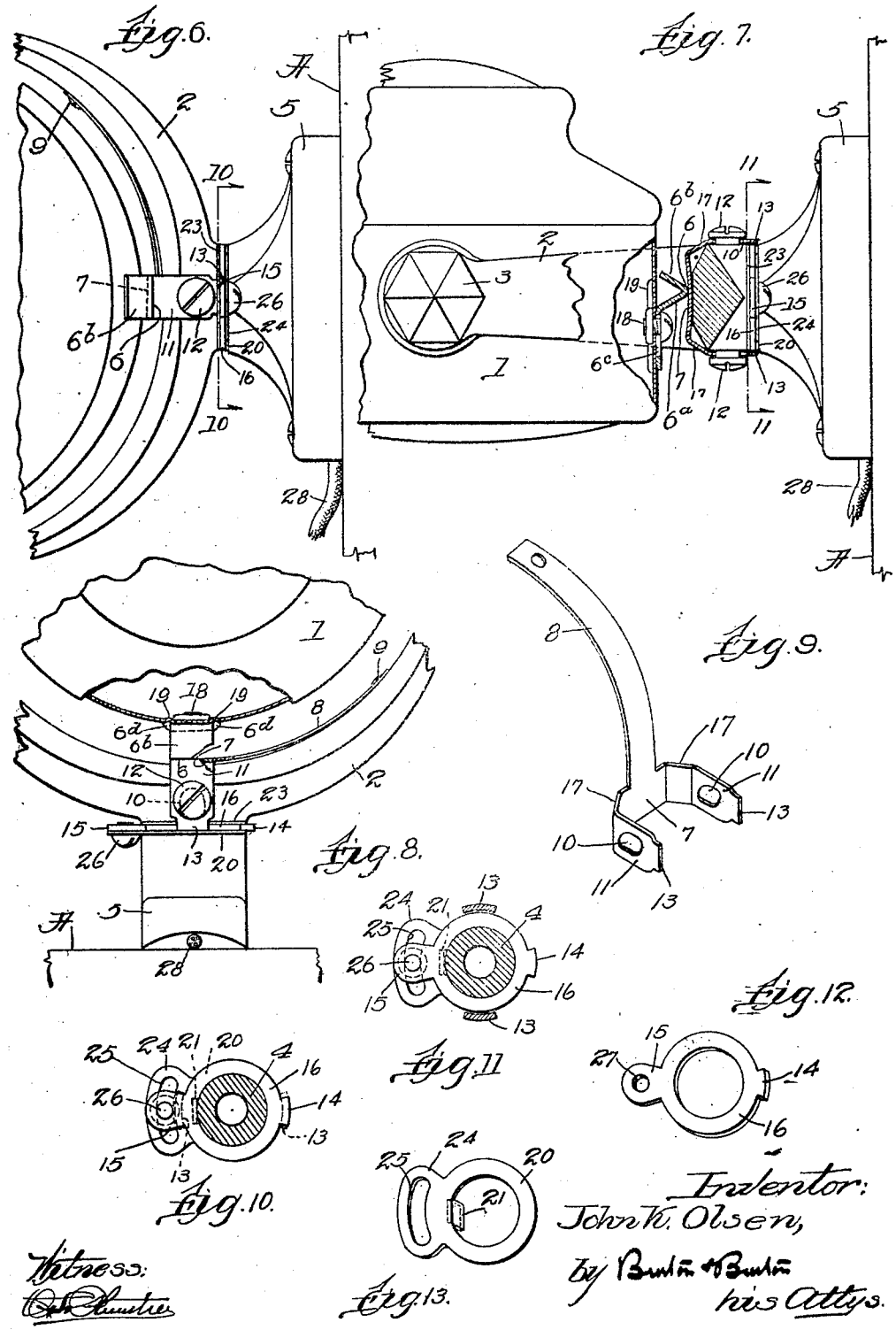

Patented Feb. 16, 1926.

1,573,418

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

RANGE-LIMITING DEVICE FOR SEARCHLIGHTS.

Application filed January 24, 1923. Serial No. 614,558.

*To all whom it may concern:*

Be it known that I, JOHN K. OLSEN, a citizen of the United States, residing in the city of Chicago, in the county of Cook and the State of Illinois, have invented certain new and useful Improvements in Range-Limiting Devices for Searchlights, of which the following is a specification, reference being had to the accompanying drawings, forming a part thereof.

This invention relates to dirigibly supported searchlights or spot lights such as are commonly carried by motor vehicles, and its purpose is to provide mechanical means for automatically limiting the angular range of adjustment of the lamp in its universal mounting so as to prevent the projection of the concentrated beam of light in certain directions. The invention comprises certain features and elements of construction herein shown and described as indicated by the claims.

In the drawings:—

Figure 1 is a diagrammatic plan view showing the searchlight mounted on a motor vehicle and indicating the angular limits determined by the range-controlling means which comprise this invention.

Figure 2 is a diagrammatic elevation corresponding to Figure 1 and indicating the vertical limits determined by the range-controlling devices.

Figure 3 is a front elevation of the searchlight and its mounting showing diagrammatically a cross section of the proscribed zone from which the light is barred by the range-limiting means.

Figure 4 is a top plan view partly in section showing the searchlight and range-controlling devices thereon in one limiting position of adjustment.

Figure 5 is a view similar to Figure 4 showing the stop devices at another limit of adjustment.

Figure 6 is a partial rear elevation of the searchlight and its mounting in the position shown in Figure 4.

Figure 7 is a partial rear elevation showing the stop devices in a non-operative position, and with the lamp turned to throw its light downwardly certain parts being in vertical section.

Figure 8 is a partial bottom plan view of the parts in the position shown in Figure 7, certain parts being in horizontal section.

Figure 9 is a detail perspective view of the movable stop member and its spring arm.

Figure 10 is a detail section taken as indicated at line 10—10 on Figure 6.

Figure 11 is a detail section taken as indicated at line 11—11 on Figure 7.

Figure 12 is a perspective view of a stop collar.

Figure 13 is a perspective view of an adjustable holding collar for the stop collar.

Figure 14 is a detail section taken as indicated at line 14—14 on Figure 5.

As shown in Figures 1, 2 and 3 the searchlight may be understood as mounted at the usual position at the left side of the windshield or front window, A, of the vehicle body, so that the lamp body, 1, shall be within convenient reach of the driver. Except for the stop devices comprising this invention the body, 1, is mounted for universal adjustment in a supporting bail, or yoke 2, having carrying trunnions, 3, 3, which engage the lamp body, 1, and having a pivotal connection by means of a swivel post, 4, in the base, 5, which is attached to the support, A. The pivot axis of the swivel post, 4, being substantially at right angles to the common axis of the trunnions, 3, 3, would permit the projection of the concentrated beam of light indicated at B in any desired direction; but for the protection of pedestrians and the drivers of approaching vehicles, it is desirable that this bright glaring light be prevented from glaring directly ahead in the path of the vehicle or in the vicinity of such direction. The stop devices therefore prevent the lamp from being swung into position for projecting its beam, B, within the horizontal angle indicated at C in Figure 1 or within the vertical angular range indicated at D in Figure 2.

To accomplish this result, a stop member, 6, is attached to the lamp body, 1, adjacent the middle part of the yoke or bail, 2, and directly over its swivel post, 4; and a movable stop member, 7, is mounted on the bail directly opposite the stop, 6, and secured by its spring arm, 8, whose remote end is fastened to an arm of the bail, 2, by a screw, 9. The stop, 7, is guided for limited play in the direction of the axis of the swivel post, 4, by engagement of slots, 10, in its yoke legs, 11, with guide screws, 12, secured in opposite faces of the bail, 2, and this movement of the stop member, 7, is controlled by depending segmental lugs, 13, on the legs, 11, co-operating with radially extending segmental lugs, 14 and 15, of a stop collar, 16, which is adjustably attached to the base, 5, as will be described.

The stop, 6, on the lamp body, 1, is formed with oppositely inclined cam surfaces, 6$^a$ and 6$^b$, and the middle portion of the stop, 7, is joined with the legs, 11, by inclined cam portions, 17, whose slope corresponds with that of the cam surfaces, 6$^a$ and 6$^b$, for co-operation therewith. When the lamp body, 1, is swung to the position shown in Figure 4, the cam surface, 6$^a$, strikes the slope of the cam portion, 17, of the stop, 7, and would slide thereon and depress the stop, 7, if the lugs, 13, were not checked by registration with and abutment on the stop lugs, 14 and 15, of the collar, 16, on the base, 5. This condition is illustrated in Figure 4, and in Figure 10, but from the latter it will be seen that if the bail, 2, be swung a few degrees upon the axis of the pivot post, 4, the lugs, 13, would be carried out of registration with the lugs, 14 and 15, and in the resulting position the lamp body, 1, could be swung further upon its trunnions, 3, causing the cam surface, 6$^a$, to depress the stop, 7, and ride over its middle portion through any desired angular range. This would mean simply that the bail, 2, was adjusted to throw the beam, B, of light either above or below the angular range, D, indicated in Figure 2. Within that range the lugs, 13, overlap the lugs, 14 and 15, so that depression of the stop member, 7, is prevented and the lamp body, 1, cannot be swung upon its trunnions, 3, to direct a beam straight ahead of the vehicle. The distance between the slopes of the cam portions, 17, of the stop, 7, corresponds to the proscribed angle, C, of Figure 1 within which it is not possible to project the beam, B, except above or below the vertical proscribed angle, D.

To permit adjustment of the stop member, 6, for relating the angle, C, accurately to the direction of travel, for example, as shown in Figure 1, said member is adjustably attached to the lamp body, 1, by a clamping screw, 18, and engaging a slot, 6$^c$, in the stop member, 6, as shown in Figure 4; and throughout its range of adjustment the stop member is guided by lateral flanges, 6$^d$, engaging shallow grooves, 19, formed in the shell of the lamp body, 1.

Since the frame or post of the windshield, A, is in some vehicles not strictly vertical, it may be necessary to adjust the position of the stop lugs, 14 and 15, after the base, 5, has been attached to the vehicle so as to bring the prescribed angle of darkness, D, at the proper height from the road surface to protect pedestrians or drivers of other vehicles. For this purpose the collar, 16, is attached to the base, 5, through the medium of a second collar, 20, having a tang or lug, 21, which engages a key slot, 22, in the bore of the base which receives the swivel post, 4, of the bail. The base and the bail are secured together by any suitable means (not shown) and thus retain the collars, 16 and 20, between their opposed shoulders, 2$^a$ and 5$^a$, preferably with a friction washer, 23, also interposed. The collar, 20, has a circumferentially extended lug, 24, with an arcuate slot, 25, through which a clamping screw, 26, extends into a threaded aperture, 27, in the lug, 15, of the collar, 16. Thus by loosening the screw, 26, the stop collar, 16, may be angularly adjusted with respect to the base, 5, in which the collar, 20, is anchored by its tang, 21, and as a result the position of the vertical angle, D, may be adjusted as desired.

It may be understood that the lead wire, 28, for the electric lamp in the lamp body, 1, may be provided with suitable connections extending through one arm of the bail, 2, if desired, but that to simplify the illustration of the present invention such connections are omitted from the drawings.

While the beam projected from the lamp is directed outside of the prescribed area, indicated in cross section by the ellipse E in Figure 3, the lamp is freely rockable upon either and both of its axes, in any direction away from that area, as indicated by the darts on Figures 1 and 2.

Specifically: In positions of the projector body, 1, in which the stop member 7 is not held down (or in) by the coacting stop, 6, the lugs 13 are held clear of abutments 14, 15 by spring 8 (see Figure 4). This position of lugs 13 permits free rotation of the lamp support, 2, upon its swivel post, 4, for directing the beam of light up and down—the angle D being included in this range. Conversely the yoke is rockable about its axis of the swivel post, 4, even through the angle indicated by C, Figure 1, except that whenever the lamp body is rocked upon its axis 3—3 to a point at which the stop 6 forces the coacting stop 7 inwardly, this motion of the latter projects its stop lug 13 into the plane of abutments 14, 15, thereby making operative the stops related to the axis of the swivel post, 4.

It will be understood, therefore, that the lamp body can be rocked to carry its stop 6 across the plate 7 only when the beam is directed at angles above or below the angle D; and that the lamp body can be rocked about its other pivot, the swivel post, 4, without restriction, only when the beam is directed at angles to the right or left of angle C.

The manner in which the angular motion about axis 4 is limited will be clearly understood from inspection of Figure 11. As far as this particular function is concerned, one of the lugs 13 might be dispensed with. But the pair of them are necessary for proper bracing of the cam portions of the stop, 7 from abutments 14, 15 in certain positions of the lamp bracket. As long as lugs 13 overlap said abutments, the stops 7 are positive checks to the motion of the lamp-borne stops, 6.

I claim:—

1. The combination with a swiveled support, a base therefor, and a lamp body pivotally mounted in the support, of a stop on the lamp body, a co-acting stop member resiliently mounted on the support, and means whereby the last mentioned stop member will be either yielding or unyielding to motion of the lamp-body stop, according to the angular position of the lamp body support upon said base, said means including an extension of said stop member, and a member having fixed relation to said base for contacting said extension in a manner to prevent yielding motion of said stop.

2. The combination with a base, a support swiveled thereon and a lamp body pivoted on the support, of a stop on the lamp body, a co-acting stop member resiliently mounted on said support, a segmental extension of the stop member, forming a stop lug, projected toward said base, and a segmental part mounted on said base and functioning at times as a stop to limit the angular travel of said extension and lamp body support, and at times as a positive lock for holding the resiliently mounted stop in operative position.

3. The combination with a lamp-body support including a swivel post, a lamp body pivoted on the support, and a base on which the swivel post is mounted, of a stop member mounted on the support and comprising two opposed, connected, oblique faces, said stop member being movable relative to its support in a direction away from the lamp body, a spring pressing said member toward the lamp body, and a stop on the lamp body, adapted to be stopped by either of said oblique faces or to override both thereof under certain conditions.

4. In combination with the lamp-carrying yoke having a swivel post or stem, the base in which the post is mounted for rotative adjustment of the yoke, for limiting said rotative adjustment comprising a U-shaped part and a leaf spring; the ends of the U-shaped part functioning as stops, and the spring being curved for mounting on the inner face of the yoke.

5. In the structure defined in claim 4, the two lateral members of the part specified being provided with registered guide-slots.

6. In combination, a swivel post, a base having a bore in which the post rockably fits, an arm integral with said post, a segmental stop-lug carried by said arm and projected toward said base, an annular part mounted on said post rotatably adjustable within a limited angle and provided with a segmental abutment for encounter with said stop-lug, said abutment being held against rotation.

7. In combination, a base having a bore therein, a swivel post rockably fitted in the base, a segmental stop-lug carried by the post, and projected towards said base, a ring mounted on said post at the mouth of said bore, said ring having integral therewith a segmental abutment and a perforated lug, both in the plane of the ring; a shoulder on said post for retaining said ring, a fixedly mounted lug having a curved slot, and a clamping bolt passing through said slot and perforated lug, whereby said abutment is angularly adjustable.

8. In the structure defined in claim 7, said perforated lug constituting a duplicate and opposite abutment, in combination with a pair of segmental stop-lugs carried by said post, the ends of said stop-lugs normally clearing said abutments when the post is rotated but being movable toward and through the plane of the abutments so as to be stopped thereby.

In testimony whereof I have hereunto set my hand at Chicago, Illinois, this 19 day of January, 1923.

JOHN K. OLSEN.